United States Patent
Huisenga et al.

(10) Patent No.: US 7,590,511 B2
(45) Date of Patent: Sep. 15, 2009

(54) FIELD DEVICE FOR DIGITAL PROCESS CONTROL LOOP DIAGNOSTICS

(75) Inventors: Garrie D. Huisenga, Chaska, MN (US);
Richard A. Lewis, Medina, MN (US);
Donald R. Lattimer, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/860,780

(22) Filed: Sep. 25, 2007

(65) Prior Publication Data

US 2009/0083001 A1 Mar. 26, 2009

(51) Int. Cl.
*G06F 11/00* (2006.01)
*G06F 11/30* (2006.01)
(52) U.S. Cl. ........................ 702/183; 702/188
(58) Field of Classification Search ............. 702/84, 702/183, 186, 187, 188; 700/26, 28; 340/635, 340/664
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Tsipouras | 73/362 |
| 4,122,719 A | 10/1978 | Carlson et al. | 73/342 |

(Continued)

FOREIGN PATENT DOCUMENTS

CA 999950 11/1976

(Continued)

OTHER PUBLICATIONS

U.S. Appl. No. 09/257,896, filed Feb. 25, 1999, Eryurek et al.

(Continued)

*Primary Examiner*—Bryan Bui
(74) *Attorney, Agent, or Firm*—Westman, Champlin & Kelly, P.A.

(57) ABSTRACT

A diagnostic field device for coupling to a two-wire process control loop of an industrial process control or monitoring system includes digital communication monitoring circuitry which is configured to couple to a two-wire process control loop. The digital communication monitoring circuitry is configured to receive a digital communication signal from the two-wire process control loop. Timing circuitry in the diagnostic field device provides a timing output. Diagnostic circuitry provides a diagnostic output based upon the digital communication signal and the timing output.

31 Claims, 3 Drawing Sheets

U.S. PATENT DOCUMENTS

| | | | |
|---|---|---|---|
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Cameron et al. | 340/870.37 |
| 4,337,516 A | 6/1982 | Murphy et al. | 364/551 |
| 4,383,443 A | 5/1983 | Langdon | 73/290 |
| 4,390,321 A | 6/1983 | Langlois et al. | 417/15 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,799 A | 4/1996 | Wishart | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |

| Patent No. | Date | Inventor | Class |
|---|---|---|---|
| 5,572,420 A | 11/1996 | Lu | 364/153 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.05 |
| 5,710,370 A | 1/1998 | Shanahan et al. | 73/1.35 |
| 5,710,708 A | 1/1998 | Wiegland | 364/470.01 |
| 5,713,668 A | 2/1998 | Lunghofer et al. | 374/179 |
| 5,719,378 A | 2/1998 | Jackson, Jr. et al. | 219/497 |
| 5,731,522 A | 3/1998 | Sittler | 73/708 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,539 A | 6/1998 | Rani | 364/557 |
| 5,764,891 A | 6/1998 | Warrior | 395/200.2 |
| 5,781,024 A | 7/1998 | Blomberg et al. | 324/763 |
| 5,781,878 A | 7/1998 | Mizoguchi et al. | 701/109 |
| 5,790,413 A | 8/1998 | Bartusiak et al. | 364/485 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,838,187 A | 11/1998 | Embree | 327/512 |
| 5,848,383 A | 12/1998 | Yunus | 702/102 |
| 5,854,993 A | 12/1998 | Crichnik | 702/54 |
| 5,854,994 A | 12/1998 | Canada et al. | 702/56 |
| 5,859,964 A | 1/1999 | Wang et al. | 395/185.01 |
| 5,869,772 A | 2/1999 | Storer | 73/861.24 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/34 |
| 5,934,371 A | 8/1999 | Bussear et al. | 166/53 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 5,995,910 A | 11/1999 | Discenzo | 702/56 |
| 6,002,952 A | 12/1999 | Diab et al. | 600/310 |
| 6,006,338 A * | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,061,603 A | 5/2000 | Papadopoulos et al. | 700/83 |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,260,004 B1 | 7/2001 | Hays et al. | 702/183 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyostsia et al. | 702/188 |
| 6,327,914 B1 | 12/2001 | Dutton | 73/861.356 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,370,448 B1 | 4/2002 | Eryurek et al. | 700/282 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,449,574 B1 | 9/2002 | Eryurek et al. | 702/99 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |
| 6,493,689 B2 | 12/2002 | Kotoulas et al. | 706/23 |
| 6,497,222 B2 | 12/2002 | Bolz et al. | 123/476 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,546,814 B1 | 4/2003 | Choe et al. | 73/862.08 |
| 6,556,145 B1 | 4/2003 | Kirkpatrick et al. | 340/870.17 |
| 6,567,006 B1 | 5/2003 | Lander et al. | 340/605 |
| 6,594,603 B1 | 7/2003 | Eryurek et al. | 702/104 |
| 6,597,997 B2 | 7/2003 | Tingley | 702/34 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,654,697 B1 | 11/2003 | Eryurek et al. | 702/47 |
| 6,701,274 B1 | 3/2004 | Eryurek et al. | 702/140 |
| 6,727,812 B2 | 4/2004 | Sauler et al. | 340/511 |
| 6,738,388 B1 | 5/2004 | Stevenson et al. | 370/465 |
| 6,751,560 B1 | 6/2004 | Tingley et al. | 702/51 |

| | | | | | |
|---|---|---|---|---|---|
| 6,754,601 B1 | 6/2004 | Eryurek et al. ............... 702/104 | GB | 2 317 969 | 4/1998 |
| 6,758,168 B2 | 7/2004 | Koskinen et al. ................ 122/7 | GB | 2 342 453 A | 4/2000 |
| 6,859,755 B2 | 2/2005 | Eryurek et al. ............... 702/183 | GB | 2 347 232 A | 8/2000 |
| 6,904,476 B2 | 6/2005 | Hedtke ........................ 710/72 | JP | 56-031573 | 3/1981 |
| 6,907,383 B2 | 6/2005 | Eryurek et al. ............... 702/183 | JP | 57196619 | 2/1982 |
| 6,915,364 B1 * | 7/2005 | Christensen et al. ......... 710/104 | JP | 58-129316 | 8/1983 |
| 6,970,003 B2 | 11/2005 | Rome et al. .................. 324/718 | JP | 59-116811 | 7/1984 |
| 7,018,800 B2 | 3/2006 | Huisenga et al. ................ 435/6 | JP | 59-163520 | 9/1984 |
| 7,040,179 B2 | 5/2006 | Drahm et al. ........... 73/861.356 | JP | 59-176643 | 10/1984 |
| 7,058,542 B2 | 6/2006 | Hauhia et al. ............... 702/183 | JP | 59-211196 | 11/1984 |
| 7,085,610 B2 | 8/2006 | Eryurek et al. ................ 700/29 | JP | 59-211896 | 11/1984 |
| 7,098,798 B2 | 8/2006 | Huisenga et al. ............ 340/635 | JP | 60-000507 | 1/1985 |
| 7,099,852 B2 | 8/2006 | Unsworth et al. .............. 706/23 | JP | 60-76619 | 5/1985 |
| 7,171,281 B2 | 1/2007 | Weber et al. .................. 700/96 | JP | 60-131495 | 7/1985 |
| 7,254,518 B2 | 8/2007 | Eryrurek et al. ............. 702/183 | JP | 60-174915 | 9/1985 |
| 2002/0013629 A1 | 1/2002 | Nixon et al. | JP | 62-30915 | 2/1987 |
| 2002/0032544 A1 | 3/2002 | Reid et al. .................. 702/183 | JP | 62-080535 | 4/1987 |
| 2002/0077711 A1 | 6/2002 | Nixon et al. .................. 700/19 | JP | 62-50901 | 9/1987 |
| 2002/0121910 A1 | 9/2002 | Rome et al. .................. 324/718 | JP | 63-169532 | 7/1988 |
| 2002/0145568 A1 | 10/2002 | Winter ........................ 343/701 | JP | 64-01914 | 1/1989 |
| 2002/0148644 A1 | 10/2002 | Schultz et al. ................. 175/39 | JP | 64-72699 | 3/1989 |
| 2002/0194547 A1 | 12/2002 | Christensen et al. .......... 714/43 | JP | 11-87430 | 7/1989 |
| 2003/0014536 A1 | 1/2003 | Christensen et al. ........ 709/238 | JP | 2-05105 | 1/1990 |
| 2003/0033040 A1 | 2/2003 | Billings ........................ 700/97 | JP | 3-229124 | 10/1991 |
| 2003/0045962 A1 | 3/2003 | Eryurek et al. ............... 700/128 | JP | 4-70906 | 3/1992 |
| 2004/0128034 A1 | 7/2004 | Lenker et al. ............... 700/282 | JP | 5-122768 | 5/1993 |
| 2004/0199361 A1 | 10/2004 | Lu et al. ...................... 702/183 | JP | 6-95882 | 4/1994 |
| 2004/0249583 A1 | 12/2004 | Eryurek et al. ................ 702/47 | JP | 06242192 | 9/1994 |
| 2005/0072239 A1 | 4/2005 | Longsdorf et al. ............. 73/649 | JP | 06-248224 | 10/1994 |
| 2006/0075009 A1 | 4/2006 | Lenz et al. .................. 708/160 | JP | 7-063586 | 3/1995 |
| 2006/0277000 A1 | 12/2006 | Wehrs ........................ 702/183 | JP | 07234988 | 9/1995 |
| 2007/0010968 A1 * | 1/2007 | Longsdorf et al. .......... 702/183 | JP | 8-054923 | 2/1996 |
| | | | JP | 8-102241 | 4/1996 |

FOREIGN PATENT DOCUMENTS

| | | | | | |
|---|---|---|---|---|---|
| DE | 32 13 866 A1 | 10/1983 | JP | 08-114638 | 5/1996 |
| DE | 35 40 204 C1 | 9/1986 | JP | 8-136386 | 5/1996 |
| DE | 40 08 560 A1 | 9/1990 | JP | 8-166309 | 6/1996 |
| DE | 43 43 747 | 6/1994 | JP | 8-247025 | 9/1996 |
| DE | 44 33 593 A1 | 6/1995 | JP | 8-313466 | 11/1996 |
| DE | 195 02 499 A1 | 8/1996 | JP | 2712625 | 10/1997 |
| DE | 296 00 609 U1 | 3/1997 | JP | 2712701 | 10/1997 |
| DE | 197 04 694 A1 | 8/1997 | JP | 2753592 | 3/1998 |
| DE | 19930660 A1 | 7/1999 | JP | 07225530 | 5/1998 |
| DE | 199 05 071 | 8/2000 | JP | 10-232170 | 9/1998 |
| DE | 19905071 A1 | 8/2000 | JP | 11-083575 | 3/1999 |
| DE | 299 17 651 U1 | 12/2000 | RU | 2190267 C2 | 9/2002 |
| DE | 199 47 129 | 4/2001 | WO | WO 94/25933 | 11/1994 |
| DE | 100 36 971 A1 | 2/2002 | WO | WO 95/23361 | 8/1995 |
| DE | 102 23 725 A1 | 4/2003 | WO | WO 96/11389 | 4/1996 |
| EP | 0 122 622 A1 | 10/1984 | WO | WO 96/12993 | 5/1996 |
| EP | 0 413 814 A1 | 2/1991 | WO | WO 96/39617 | 12/1996 |
| EP | 0 487 419 A2 | 5/1992 | WO | WO 97/21157 | 6/1997 |
| EP | 0 512 794 A2 | 11/1992 | WO | WO 97/25603 | 7/1997 |
| EP | 0 594 227 A1 | 4/1994 | WO | WO 98/06024 | 2/1998 |
| EP | 0 624 847 A1 | 11/1994 | WO | WO 98/13677 | 4/1998 |
| EP | 0 644 470 A2 | 3/1995 | WO | WO 98/14855 | 4/1998 |
| EP | 0 697 586 A2 | 2/1996 | WO | WO 98/20469 | 5/1998 |
| EP | 0 749 057 A1 | 12/1996 | WO | WO 98/39718 | 9/1998 |
| EP | 0 825 506 A2 | 7/1997 | WO | WO 99/19782 | 4/1999 |
| EP | 0 827 096 A2 | 9/1997 | WO | WO 00/41050 | 7/2000 |
| EP | 0 838 768 A2 | 9/1997 | WO | WO 00/55700 | 9/2000 |
| EP | 1 022 626 A2 | 10/1997 | WO | WO 00/70531 | 11/2000 |
| EP | 0 807 804 A2 | 11/1997 | WO | WO 01/01213 A1 | 1/2001 |
| EP | 1 058 093 A1 | 5/1999 | WO | WO 01/19440 | 3/2001 |
| EP | 0 335 957 B1 | 11/1999 | WO | WO 01/77766 | 10/2001 |
| EP | 1 022 626 A2 | 7/2000 | WO | WO 01/90704 A2 | 11/2001 |
| FR | 2 302 514 | 9/1976 | WO | WO 02/27418 | 4/2002 |
| FR | 2 334 827 | 7/1977 | WO | WO 03/081002 | 10/2003 |
| GB | 928704 | 6/1963 | | | |
| GB | 1 534 280 | 11/1978 | | | |
| GB | 1 534 288 | 11/1978 | | | |
| GB | 2 310 346 A | 8/1997 | | | |

OTHER PUBLICATIONS

"A TCP\IP Tutorial" by, Socolofsky et al., Spider Systems Limited, Jan. 1991 pp. 1-23.

"Approval Standards For Explosionproof Electrical Equipment General Requirements", Factory Mutual Research, C1. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, C1. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard For Use in Industrial Control Systems Part 4: Data Link Protocol Specification, ISA-S50.02-1997, Part 4, Aug. 1997, pp. 1-148.
"Fieldbus Support For Process Analysis" by, Blevins et al., Fisher-Rosemount Systems, Inc., 1995, pp. 121-128.
"Fieldhouse Technical Overview Understanding Foundation™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"PC Software Gets Its Edge From Windows, Components, and the Internet", Wayne Labs, I&CS, Mar. 1997, pp. 23-32.
Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—Simula.*, 1995, pp. 409-437.
"A Knowledge-Based Approach for Detection and Diagnosis of Out-of-Control Events in Manufacturing Processes," by P. Love et al., *IEEE*, 1989, pp. 736-741.
"Advanced Engine Diagnostics Using Universal Process Modeling", by P. O'Sullivan, *Presented at the 1996 SAE Conference on Future Transportation Technology*, pp. 1-9.
"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., *Report No. QUEL 1884/91*, (1991).
"Taking Full Advantage of Smart Transmitter Technology Now," by G. Orrison, *Control Engineering*, vol. 42, No. 1, Jan. 1995.
"Application of Neural Networks for Sensor Validation and Plant Monitoring," by B. Upadhyaya et al., *Nuclear Technology*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.
"Development of a Resistance Thermometer For Use Up to 1600° C", by M. J. de Groot et al., *CAL LAB*. Jul./Aug. 1996, pp. 38-41.
"Survey, Applications, And Prospects of Johnson Noise Thermometry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.
"Tuned-Circuit Dual-Mode Johnson Noise Thermometers," by R.L. Shepard et al., Apr. 1992.
"Tuned-Circuit Johnson Noise Thermometry," by Michael Roberts et al., $7^{th}$ *Symposium on Space Nuclear Power Systems*, Jan. 1990.
"Smart Field Devices Provide New Process Data, Increase System Flexibility," by Mark Boland, *I&CS*, Nov. 1994, pp. 45-51.
"Wavelet Analysis of Vibration, Part I: Theory[1]," by D.E. Newland, *Journal of Vibration and Acoustics*, vol. 116, Oct. 1994, pp. 409-416.
"Wavelet Analysis of Vibration, Part 2: Wavelet Maps," by D.E. Newland, *Journal of Vibration and Acoustics*, vol. 116, Oct. 1994, pp. 417-425.
"Development of a Long-Life, High-Reliability Remotely Operated Johnson Noise Therometer," by R.L. Shepard et al., *ISA*, 1991, pp. 77-84.
"Application of Johnson Noise Thermometry to Space Nuclear Reactors," by M.J. Roberts et al., *Presented at the 6th Symposium on Space Nuclear Power Systems*, Jan. 9-12, 1989.
"A Decade of Progress in High Temperature Johnson Noise Thermometry," by T.V. Blalick et al., *American Institute of Physics*, 1982 pp. 1219-1223.
"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.
"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.
"Detecting Blockage in Process Connections of Differential Pressure Transmitters", by E. Taya et al., *SICE*, 1995, pp. 1605-1608.
"Development and Application of Neural Network Algorithms For Process Diagnostics," by B.R. Upadhyaya et al., *Proceedings of the 29th Conference on Decision and Control*, 1990, pp. 3277-3282.
"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1977), pp. 68-88.

"Keynote Paper: Hardware Compilation—A New Technique for Rapid Prototyping of Digital Systems—Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

."In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Ypadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," *IBM Technical Disclosure Bulletin*, vol. 20, No. 5, pp. 1954 (Oct. 1977).

"A Self-Validating Thermocouple," Janice C-Y et al., *IEEE Transactions on Control Systems Technology*, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6th. WWW Conference Workshop on Embedded Web Technology, Santa Clara, CA (Apr. 7, 1997).

"Internal Statistical Quality Control for Quality Monitoring Instruments", by P. Girling et al., *ISA*, 15 pgs., 1999.

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," By H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schenlle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr. 3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press, p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A. et al., IEEE Transactions on Magnetic, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", *DAU STAT Refresher*, http://cne.gmu.edu/modules/dau/stat/mvavgs/wma_bdy.html., (1995).

U.S. Appl. No. 10/675,014, filed Sep. 2003, Longsdorf et al.
U.S. Appl. No. 10/744,809, filed Dec. 2003, Brown et al.
"Statistics Glossary: Time Series Data", by Easton et al., http://www.stats.gla.ac.uk/steps/glossary/time_series.html, Sep. 1997.
"The Indicators Story", Sustainable Seattle, pp. 55-59, 1998.
"Detecting Regimes in Temperature Time Series", by Clemins et al., *Artificial Neural Networks in Engineering, Proceedings*, pp. 727-732, 2001.
"Re: Digital Filter-Moving Average", The Math Forumn, http://mathforum.org/discuss/sci.math/a/t/177212, Sep. 28, 1998.
U.S. Appl. No. 10/893,144, filed Jul. 2004, Brown et al.
"Notification of Transmittal of the International Search Report and the Written Opinion of the International Searching Authority", or the Declaration for PCT/US2004/017300.
"Invitation to Pay Additional Fees" for PCT/US2004/031678.
"Notification of Transmittal of the International Search Report or the Declaration", PCT/US2004/025291.
"Notification of Transmittal of The International Search Report or the Declaration", PCT/US2004/031678.
"Notification of Transmittal of The International Search Report or the Declaration", PCT/US2005/011385.
"Notification of Transmittal of the International Preliminary Report on Patenatability", PCT/US2004/031678.
Written Opinion, PCT/US02/14560, filed May 9, 2002; 6 pages.
"Notification of Transmittal of International Search Report and the Written Opinion", PCT/US2004/022736.
"Notification of Transmittal of the International Search Report", PCT/US00/14798.
"CompProcessor For Piezoresistive Sensors" MCA Technologies Inc. (MCA7707),pp. 1-8, prior to Jan. 2009.
"Modular Microkernel Links GUI And Browser For Embedded Web Devices" by, Tom Williams, pp. 1-2, prior to Jan. 2009.
Parallel. Fault-Tolerant Control and Diagnostics System for Feedwater Regulation in PWRS, by E. Eryurek et al., *Proceedings of the American Power Conference*, prior to Jan. 2009.
"Using Artificial Neural Networks to Identify Nuclear Power Plant States," by Israel E. Alguindigue et al., pp. 1-4, prior to Jan. 2009.
"Application of Neural Computing Paradigms for Signal Validation," by B.R. Upadhyaya et al., *Department of Nuclear Engineering*, pp. 1-18, prior to Jan. 2009.
"Internet Technology Adoption into Automation" by, Fondl et al., Automation Business, pp. 1-5, prior to Jan. 2009.
Microsoft Press Computer Dictionary, $3^{rd}$ Edition p. 124, prior to Jan. 2009.
Web Pages from www.triant.com (3 pgs.), prior to Jan. 2009.
Notification of Transmittal of the International Search Report and the Written Opinion of the International Searching Authority, dated Feb. 6, 2009, in corresponding PCT Application No. PCT/US2008/011019.

* cited by examiner

FIELD DEVICE FOR DIGITAL PROCESS CONTROL LOOP DIAGNOSTICS

BACKGROUND OF THE INVENTION

Reference is made to co-pending application Ser. No. 11/543,349, filed Oct. 5, 2006, entitled "TWO-WIRE PROCESS CONTROL LOOP DIAGNOSTICS," the content of which is hereby incorporated by reference in its entirety.

The present invention relates to industrial process control and monitoring systems. More specifically, the present invention relates to diagnostics of industrial process control and monitoring systems which utilize two-wire process control loops to transmit digital data.

Industrial process control and monitoring systems are used in many applications to control and/or monitor operation of an industrial process. For example, an oil refinery, chemical processing plant, or paper manufacturing facility may have numerous processes which must be monitored and controlled.

In such industrial processes, process variables are measured at remote locations across the process. Example process variables include temperature, pressure, flow and the like. This information is transmitted over a two-wire process control loop to a central location, for example, a control room. Similarly, process variables can be controlled using controllers placed in the process. The controllers receive control information from the two-wire process control loop and responsively control a process variable, for example by opening or closing a valve, heating a process fluid, etc.

Various protocols have been used to communicate on two-wire process control loops. One protocol uses a 4-20 mA signal to carry information on the loop. The 4 mA signal can represent a zero or low value of a process variable while the 20 mA signal can represent a high or full scale value. The current can be controlled by a process variable transmitter to values between 4 and 20 mA to represent intermediate values of the process variable. A more complex communication technique is the HART® communication protocol in which digital information is superimposed onto a 4-20 mA signal. Typically, in such configurations a separate two-wire process control loop is required for each field device.

A more complex communication technique used on two-wire process control loops is generally referred to as fieldbus-based protocols, such as Foundation™ fieldbus. The process control loop is commonly referred to as a segment. In a Fieldbus protocol, all information is transmitted digitally and the analog current level on the segment is not required to carry information. One advantage of such a configuration is that multiple process variable transmitters or controllers can be coupled in parallel and share the same segment. Each device on the segment has an address such that it can identify messages which are addressed to it. Similarly, messages transmitted by a field device can include the address of the device so that the sender can be identified. In such Fieldbus based systems, all of the Fieldbus segments of the process control loop contain timers which are synchronized with a Link Active Scheduler (LAS). The LAS sends a time update on the loop and the individual field devices synchronize their clocks to the time signal.

SUMMARY

A diagnostic field device for coupling to a two-wire process control loop of an industrial process control or monitoring system includes power supply circuitry configured to coupled to the two-wire process control loop and provide a power output to circuitry of the diagnostic device to thereby power the diagnostic device with power received from the two-wire process control loop. Digital communication monitoring circuitry is configured to receive a digital communication signal from the two-wire process control loop. Timing circuitry provides a timing output. Diagnostic circuitry diagnoses operation of the two-wire process control loop based upon the digital communication signal and the timing output. The diagnostics can also be placed in the field device.

DETAILED DESCRIPTION

The present invention is directed to diagnostics in a process control loop including diagnostics of the devices connected to the process control loop. In particular, the present invention provides diagnostics including detection of a failed or potentially failing component in a two-wire process control loop operating in accordance with a fieldbus based protocol in which timing signals, or communication signals which use timing to convey data, are transmitted on the loop.

Figure 1:
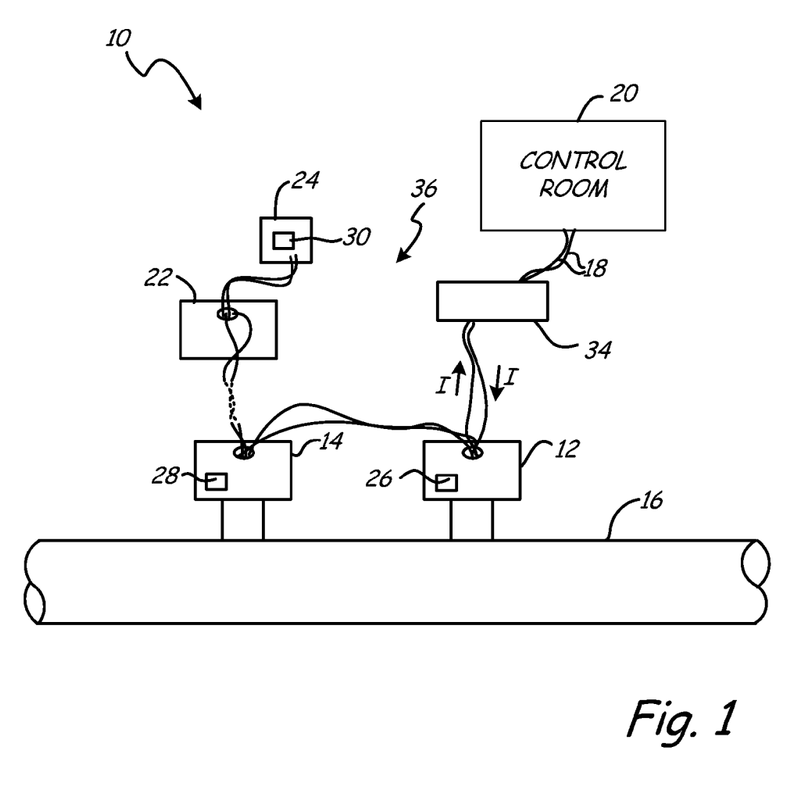
FIG. 1 is a simplified diagram of a process control or monitoring installation which includes a two-wire process control loop.

FIG. 1 is a simplified diagram showing a process control or monitoring system 10 including field devices 12 and 14 coupled to process piping 16. Devices 12 and 14 are coupled to a single two-wire process control loop 18 which in turn couples to a control room 20. FIG. 1 also illustrates a two-wire process control loop diagnostic device 22 coupled to loop 18. The loop 18 carries a current I which can be used to provide power to all of the field devices on loop 18 and can be generated at control room 20. Information is transmitted digitally on loop 18 by modulating a digital signal on top of the loop current I. For example, devices 12 and 14 can include unique addresses such that they are able to uniquely identify messages which they transmit, as well as identify which received messages are addressed to them. Devices 12 and 14 can comprise any type of field device including process variable transmitters and controllers. An intrinsic safety (IS) barrier 34 is also shown in FIG. 1. IS barrier 34 isolates circuitry in control room 20 from the 'field' 36 to prevent excessive energy from being delivered to the field devices. Element 34 can represent an IS barrier and/or a signal repeater on loop 18. Such components can introduce clocking errors and increase the difficulties associated with performing diagnostics on components in the field when using diagnostic equipment which is located in the control room 20. Example locations for equipment which is located at a field location include equipment located in the IS barrier 34, equipment located in a repeater, equipment located in a discrete field device, equipment located in a field instrument such as a controller or transmitter, equipment incorporated as a component in a junction box, or in any combination of devices.

The process control loop 18 illustrated is including a Link Active Scheduler (LAS) 24. (LAS) 24 is used to synchronize communication on loop 18. The Link Active Scheduler 24 can be located anywhere along loop 18, including in the field with field devices 12 or 14, or in the control room 20. During operation, the LAS 24 transmits time (clock) information on the loop 18. This time information is used by individual devices on the loop 18 to synchronize their internal clocks 26 and 28 shown in field devices 12 and 14, respectively. During operation, the Link Active Scheduler 24 provides clock information on loop 18 based upon internal clock circuitry 30. More specifically, the LAS 24 periodically sends a time update transmission on loop 18 which allows the individual field devices 12 and 14 on loop 18 to synchronize their internal clocks 26 and 28, respectively to the internal clock circuitry 30 of Link Active Scheduler 24.

Figure 2:
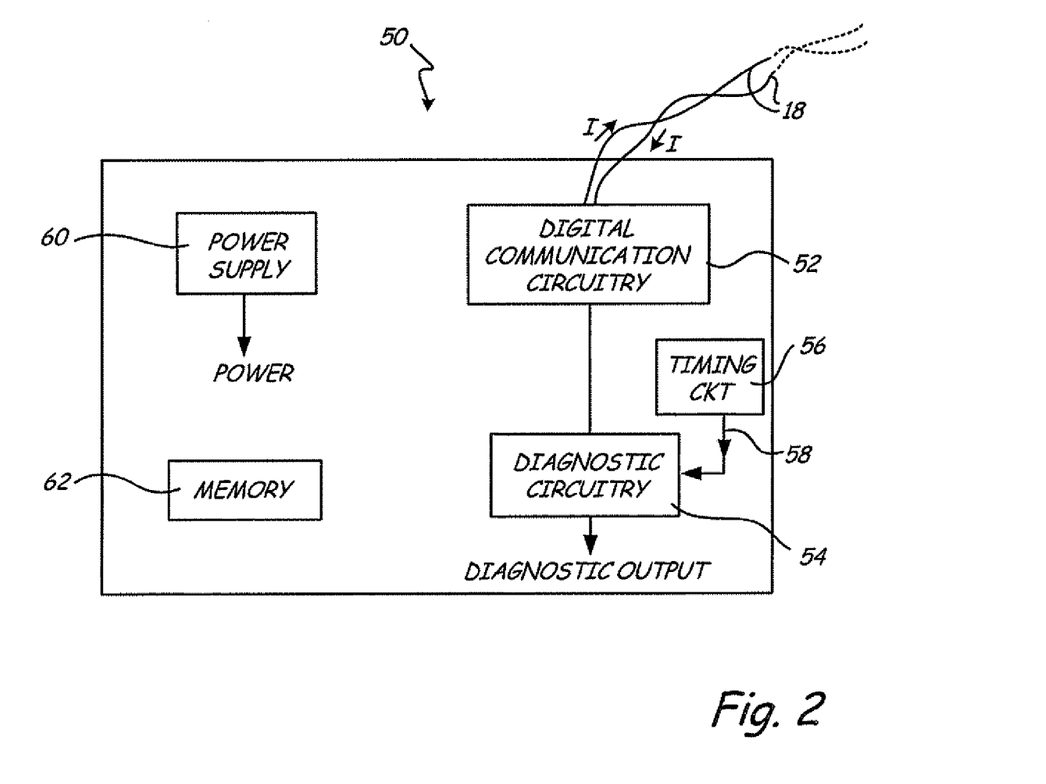
FIG. 2 is a simplified block diagram of a process control loop diagnostic device.

FIG. 2 is a simplified block diagram of a two-wire process control loop diagnostic device 50 in accordance with the present invention, similar to device 22 shown in FIG. 1 and can be an independent device such as device 22 or can be included in other equipment such as field devices 12 or 14, component 34 or LAS 24. Diagnostic device 50 couples to two-wire process control loop 18 and includes digital communication circuitry 52 and diagnostic circuitry 54. Timing circuitry 56 maintains time information and provides a timing output 58 to diagnostic circuitry 54. Two-wire process control loop diagnostic device 50 can, in some configurations, be implemented in field device 12, field device 14, stand-alone diagnostic device 22, IS barrier 34, a junction box and/or control room 20.

Diagnostic device also includes optional power supply circuitry 60 which couples to the two-wire process control loop 18 and can be configured to provide a power output for powering all of the circuitry within diagnostic device 50. Further, a memory 62 is provided for storing information. For example, memory 62 can be used for storing diagnostic data, data captured from process control loop 18, programming instructions for a microprocessor used in implementing diagnostic circuitry 54, various loop parameters, configuration data, etc. As mentioned above, the diagnostic circuitry can be implemented in a microcontroller, along with other supporting components.

During operation, the diagnostic device 50 monitors digital communications traffic on loop 18 using digital communication circuitry 52. The digital communication circuitry provides an output to diagnostic circuitry 54. Diagnostic circuitry 54 provides a diagnostic output related to a diagnostic condition of the process control loop, including devices on the process control loop, as a function of the received digital signal and the timing output 58 from the timing circuitry 56. Although it is possible to locate the diagnostic circuitry 54 in the control room 20 shown in FIG. 1. The addition of components 34 such as intrinsic safety barriers and/or repeaters which separate the control room 20 from the field 36 can introduce inaccuracies in the data collected by the diagnostic circuitry. More specifically, such components can introduce inaccuracies in the timing signal making it more difficult to obtain accurate information of the status of components in the field. When located in the field 36, the diagnostic circuitry 54 can be located in an independent device such as device 22 shown in FIG. 1, in a field device such as field devices 12 or 14, in an intrinsic safety or repeater component 34, as part of a junction box or the like, or in any combination of devices.

Figure 3:
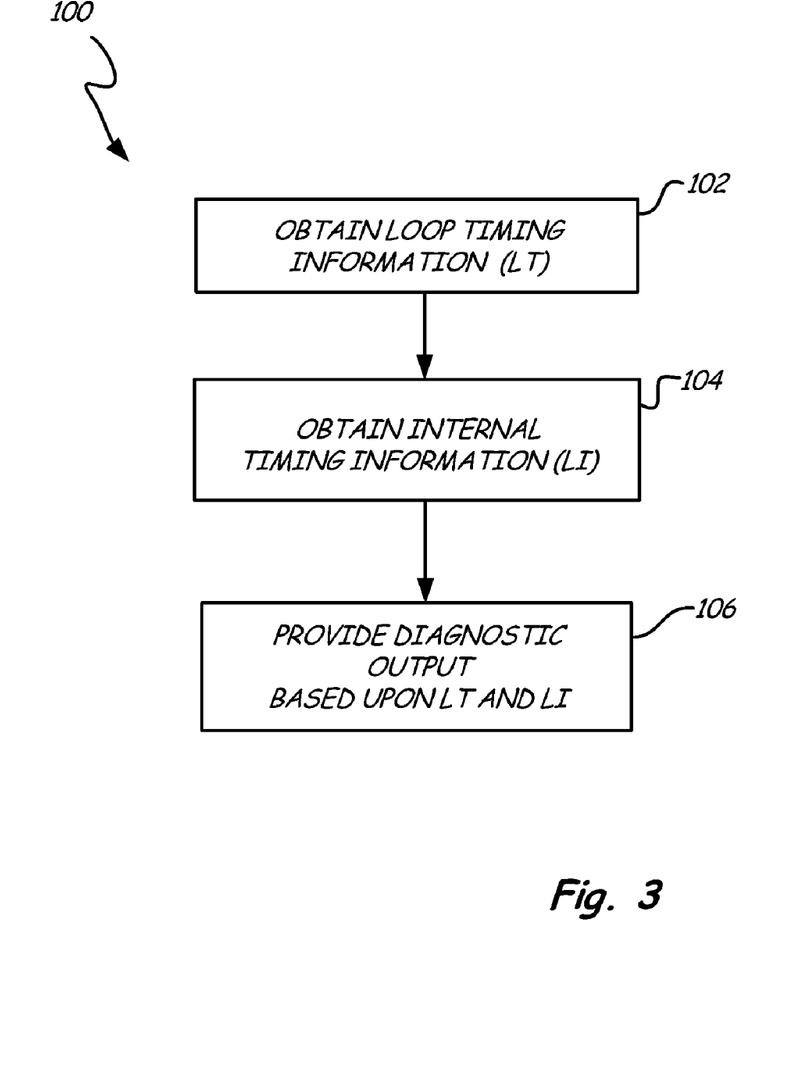
FIG. 3 is a simplified block diagram showing steps in accordance with the present invention.

FIG. 3 provides a simplified block diagram 100 of steps in accordance with the present invention. In block diagram 100, loop timing information (LT) is obtained at block 102. The loop timing data (LT) can be related to any data or information which is transmitted on process control loop which is encoded based upon time or otherwise carries data which is related to time. At block 104, timing data (LI) is obtained internally, for example, from timing circuitry 56 shown in FIG. 2. At block 106, a diagnostic output is provided based upon the loop timing data (LT) and the internal timing information (LI). Although the steps in FIG. 3 are illustrated in a particular sequence, the present invention is not limited to such a sequence and the steps can be implemented in any order and can be implemented partially or wholly simultaneously.

In one configuration, the loop timing data (LT) obtained at step 104 is related to the amount of correction needed to synchronize a field device, for example, field device 12 or 14 on loop 18, with the clock signal from Link Active Scheduler 24. In such a configuration the diagnostic output is a function of the amount of required correction. Further if the correction is required for only a single field device, the diagnostic algorithm output can provide an output indicating a problem is associated with a particular device. However, if similar synchronization errors are seen across numerous devices, the diagnostic output can indicate that there is a more global failure occurring, for example, a failure in loop wiring or in the Link Active Scheduler 24. Similarly, the diagnostic circuitry 54 can monitor trends in the relationship between the loop timing data (LT) and the internal timing information (LI). For example, if the amount of correction needed to maintain synchronization continues to increase, the diagnostic circuitry 54 can provide an output that there is an impending failure.

In another configuration, the diagnostic circuitry 54 monitors communication transmissions carried on process control loop 18 and identifies the occurrence of communication errors, for example, as exemplified by a bad data transmission, or by request for a retransmission of information. The diagnostic circuitry 54 monitors the process control loop and identifies, for example, a missed token pass, a live list appearance, or DLL (Data Link Layer) information request retries. A live list appearance is a request to re-connect to the network. If a DLL retry is requested for a response to a request, the error is in the receiver. If the first request is not seen, then the error is in the field device. This data can be monitored and statistically characterized. If a particular device in process control loop 18 shows a trend toward increased communication errors, diagnostic circuitry 54 can provide a predictive output to indicate an impending failure. If the diagnostic device 50 is implemented as an independent device, circuitry 24 is capable of providing diagnostic information related to particular devices and identifying whether a communication failure is due to an invalid or corrupt request on the process control loop 18, or due to an invalid, corrupt or missing response. Further, the diagnostic circuitry 54 can be configured to monitor for transmissions from the Link Active Scheduler 24. If transmissions are sporadic or stopped completely, the diagnostic circuitry 54 can make a determination that the LAS 24 is faulty and provide an output accordingly. Further, additional analysis can be provided if a particular communication error analysis is coupled with a hardware analysis. Some of which are explained in patent application Ser. No. 11/543,349, filed Oct. 5, 2006. For example, if an invalid PDU packet Network communication packet is associated with a detected increase in amplitude of the loop communication waveform, this can indicate that two devices are attempting to communicate simultaneously. Such information can be used to infer that an address assignment problem exists, or that there is a faulty device that is communicating incorrectly.

With diagnostic circuitry 22 including an independent timing circuit 56, the timing of all of the communications on loop 18 can be monitored, analyzed, and trends identified. This information can be reported either locally or remotely. Such timing measurements can be used to identify potential problems as well as possible degradations of the loop segment 18 or of individual loop devices such as field devices 12 and 14. Examples of specific measurements which can be monitored include:
1. The response time to require data from each device on the loop.
2. Token hold times of each device on the loop.
3. Inactive time on a particular loop.
4. Timing of wave forms which are out of compliance relative to network parameters.
5. Slot time violations.
6. Function block execution time variations or increases which are outside of specifications.
7. Stale data indications.

Further, diagnostics can be implemented to indicate potential problems in individual devices. For example, a number of rejected write requests to a particular device can be identified and used as an indication of a failing device. Such diagnostic circuitry 54 can be used to read back information from field devices to obtain additional diagnostic data. This allows a user to service a specific device during routine maintenance and thereby reduces system downtime. In another example configuration, the diagnostic circuitry 54 is configured to read the MIB (Manufacturers Information Block) from certain process devices in order to access diagnostic data from that particular diagnostic device. Some of the information listed in the examples can only be accessed by using a proprietary data interface over the segment. For example, this data can be analyzed, along with electrical parameters measured from the process control loop, in order to provide enhanced diagnostics. Time stamping of occurrences using time data from timing circuitry 56 can be used to enable enhanced statistical analysis. The use of statistical analysis of events and communication timing provides the ability to predict potential failures prior to a catastrophic failure. The time stamping of event occurrences, and the application of statistical analysis to events, allows a device to provide an output indicating cause of the failure. This reduces diagnostic time and provides additional knowledge to the operator. This allows the operator to service the device prior to ultimate failure and enables improved statistical analysis.

Many of the above described diagnostics can be enhanced if the diagnostic circuitry 54 is coupled with a field device 12, 14 which can provide additional information such as the amount of correction required for synchronization with the clock 30 of the LAS 24. When coupled to, or in communication with, known process field devices, the diagnostic circuitry 54 can provide more accurate diagnostics because the particular operating parameters and capabilities of the field device can be accessed by the diagnostic circuitry 54 and incorporated into the diagnostics. The output from the diagnostic circuitry 54 can be in the form of a local display or other local output, provided remotely over an Ethernet connection, wireless transmission, cellular phone connection or the like, or can be transmitted on the process control loop 18, for example spontaneously or in response to a specific query such as Fieldbus query.

Although it is possible to perform some of these diagnostic techniques at the remote control room, such a configuration may lose timing information. For example, intrinsic safety barriers and repeaters can be used which may alter the timing data carried on a process control loop 18 when it reaches the control room 20. By placing the diagnostic circuitry 54 at a field location, the circuitry 50 is better configured to access real time data. The diagnostic information can be transmitted back to a central location, such as control room 20, displayed locally, transmitted using other techniques such as Ethernet transmissions, wireless or cell phone transmissions, etc.

In various aspects, the present invention includes a diagnostic device placed on a Fieldbus segment for use in performing diagnostics on other devices on the segment based upon timing information. The device can monitor some or all of the communication on a particular segment and may contain an internal, independent clock. The device 50 can provide time stamping of events on the process control loop. In other words, timing information from timing circuitry 56 can be associated with a particular data point or occurrence in the process. In a specific configuration, the device 50 can monitor the amount of correction required to synchronize individual devices during a time update from a Link Active Scheduler by comparing its internal clock to the time update. The device 50 can be configured to measure communication timing on the process control loop 18 such as the response time required by a particular device on the loop segment, token hold times, inactive time along the loop segment, timing which is not within compliance compared to network parameters, slot time violations, function block execution times, stale data indications, communication retries and other communication timing. The device can monitor loop communication and monitor DLL retries, missed token passes, claim LAS occurrences, live list appearances, etc. The device can be configured to monitor the loop 18 for communications to allow diagnostics on all of the devices on the loop based upon the number of rejected write requests to each device or the quantity of periodic writes to non-volatile memory required by a device. This can provide an indication of wear on the device. Further, diagnostic device 50 can be used to read data from other devices on the loop to obtain diagnostic information which is otherwise not transmitted. The diagnostic device can be configured to provide additional information, either locally or remotely, to enable some of the above diagnostics and can be used to perform statistical analysis based upon timing or other information. By monitoring trends in the diagnostic, the diagnostic device 50 can predict potential failures along the loop 18. The predictive information can be based upon trending, analysis, or other techniques. Such information can be reported back to the central control room 20 for use by an operator. The diagnostic device can continuously monitor the loop 18 or can periodically "wake up" and sample the loop to perform diagnostics.

In various aspects, the diagnostic circuitry 54 of the present invention provides an output which includes conclusions, or other information, as to the cause or source of a particular diagnostic condition. The device can be permanently located, for example, in the field and does not require additional support equipment such as a personal computer or the like. In some configurations, the diagnostic circuitry is completely powered with power received from the two-wire process control loop 18. Various types of diagnostics can be performed such as immediate response, including the minimum, maximum, standard deviation or mean. For example, identifying a single device with significant changes in its parameters which relate to timing can provide an indication that that device is failing. However, if, for example, other tokens are properly handled, then a problem can be identified as originating in the buffer handling system of the Fieldbus interface circuitry. Further, if multiple devices are demonstrating such problems simultaneously, it is likely that there is noise on a segment of the loop 18 or wiring problems.

Similarly, the token hold time or pass token responses can be monitored by device 50, including minimum time, maximum time, standard deviation or mean. A failure among multiple devices can indicate problems with a particular segment of the process control loop. On the other hand, immediate responses which are proper will imply changes in a particular devices processor loading because such responses are typically handled by the buffer subsystem in the device hardware.

In another example, stale data counts are monitored by device 50. This includes stale data counts which are greater than zero but less than the maximum allowed by a particular segment of loop 18. Changes in the number of stale data information published by field devices can be used to device 50 to provide an indication that the processor of a particular field device is overloaded. Similarly, DLL retries (counts per unit of time), if from a single device, can provide an indication that that particular device has detective sending or receiving hardware. However, increased counts across multiple field devices can provide an indication that there is a problem with a particular loop segment or with the intrinsic safety barrier. The above diagnostics are for example purposes and the present invention is not limited to those specifically set forth herein.

Although the present invention has been described with reference to preferred embodiments, workers skilled in the art will recognize that changes may be made in form and detail without departing from the spirit and scope of the invention. As used herein, a two-wire process control loop includes field devices coupled to the loop in addition to loop wiring.

What is claimed is:

1. A diagnostic field device for coupling to a two-wire process control loop of an industrial process control or monitoring system, comprising;
    power supply circuitry configured to coupled to the two-wire process control loop and provide a power output to circuitry of the diagnostic device to thereby power the diagnostic device with power received from the two-wire process control loop;
    digital communication monitoring circuitry configured to receive a digital communication signal from the two-wire process control loop, the digital communication signal including loop timing data;
    timing circuitry configured to provide a timing output comprising internal timing data; and
    diagnostic circuitry configured to diagnose operation of the two-wire process control loop based upon the loop timing data of the digital communication signal and the internal timing data of the timing output.

2. The device of claim 1 including a memory configured to store a diagnostic output from the diagnostic circuitry.

3. The device of claim 1 wherein the digital communication circuitry monitors transmissions from a Link Active Scheduler (LAS) to thereby provide the digital communication signal.

4. The device of claim 1 wherein the diagnostic field device is configured to operate as a transmitter.

5. The device of claim 1 wherein the process control loop operates in accordance with a FieldBus standard.

6. The device of claim 1 wherein the diagnostic circuitry monitors a response time for diagnosing the operation of the two-wire process control loop.

7. The device of claim 6 wherein the response time is related to a failing field device.

8. The device of claim 1 wherein the diagnostic circuitry monitors token hold times.

9. The device of claim 1 wherein the diagnostic circuitry monitors inactive time.

10. The device of claim 1 wherein the diagnostic circuitry monitors a timing of waveforms.

11. The device of claim 1 wherein the diagnostic circuitry monitors slot time violations.

12. The device of claim 1 wherein the diagnostic circuitry monitors stale data indications.

13. The device of claim 1 wherein an intrinsic safety barrier is positioned between the diagnostic field device and a control room.

14. The device of claim 1 wherein the diagnostic circuitry monitors trends in a relationship between the digital communication signal and the timing output.

15. The device of claim 1 wherein the diagnostic circuitry identifies an increase in amplitude of a loop communication waveform.

16. The device of claim 1 wherein the diagnostic circuitry is configured to associate time information with a diagnosed condition of the two-wire process control loop.

17. A method for diagnosing operation of a two-wire process control loop of an industrial process control loop monitoring system, comprising:
    receiving power and digital communication signals from the two-wire process control loop, the digital communication signal including loop timing data;
    powering circuitry of a diagnostic device with power received from the two-wire process control loop;
    providing a timing output comprising internal timing data which is substantially independent of data received from the two-wire process control loop; and
    diagnosing operation of the two-wire process control loop based upon the loop timing data of the received digital communication signal and the internal timing data of the timing output.

18. The method of claim 17 including storing a diagnostic output in a memory.

19. The method of claim 17 wherein the received digital communications signal is from a Link Active Scheduler (LAS).

20. The method of claim 17 wherein the process control loop operates in accordance with a FieldBus standard.

21. The method of claim 17 wherein the diagnosing is based upon a response time.

22. The method of claim 21 wherein the response time is related to a failing field device.

23. The method of claim 17 wherein the diagnosing is based upon token hold times.

24. The method of claim 17 wherein the diagnosing is based upon inactive time.

25. The method of claim 17 wherein the diagnosing is based upon timing of waveforms.

26. The method of claim 17 wherein the diagnosing is based upon slot time violations.

27. The method of claim 17 wherein the diagnosing is based upon stale data indications.

28. The method of claim 17 wherein the diagnosing is based upon trends in a relationship between the digital communication signal and the timing output.

29. The method of claim 17 wherein the diagnosing is based upon identifying an increase in amplitude of a loop communication waveform.

30. The method of claim 17 including associating time information with a diagnosed condition of the two-wire process control loop.

31. The method of claim 17 including providing an intrinsic safety barrier which is positioned between the diagnostic field device and a control room.

* * * * *